United States Patent [19]
Kuriyama et al.

[11] Patent Number: 5,621,623
[45] Date of Patent: Apr. 15, 1997

[54] DC-DC CONVERTER USING FLYBACK VOLTAGE

[75] Inventors: Hirohito Kuriyama; Keiichi Kaneko; Shigeki Kameyama; Rikurou Tanahashi; Akira Yamamoto, all of Kawasaki, Japan

[73] Assignee: Fujitsu Limited, Kawasaki, Japan

[21] Appl. No.: 401,000

[22] Filed: Mar. 9, 1995

Related U.S. Application Data

[63] Continuation-in-part of Ser. No. 202,558, Feb. 28, 1994, abandoned.

[30]     Foreign Application Priority Data

Jan. 28, 1994 [JP] Japan .................................. 6-008810

[51] Int. Cl.$^6$ .................................................. H02M 3/335
[52] U.S. Cl. .................................... 363/20; 363/56
[58] Field of Search ............................. 363/17, 20, 21, 363/56, 98, 132

[56]             References Cited

U.S. PATENT DOCUMENTS

| | | | |
|---|---|---|---|
| 4,438,485 | 3/1984 | Voigt | 363/21 |
| 4,890,210 | 12/1989 | Myers | 363/21 |
| 5,278,748 | 1/1994 | Kitajima | 363/56 |
| 5,347,164 | 9/1994 | Yeh | 307/66 |
| 5,430,633 | 7/1995 | Smith | 363/20 |
| 5,442,536 | 8/1995 | Zimmermann | 363/20 |

*Primary Examiner*—Stuart N. Hecker
*Attorney, Agent, or Firm*—Staas & Halsey

[57]             ABSTRACT

When a MOS transformer switch 14 shifts from an ON state to an OFF state, a fly-back spike voltage is induced from a secondary winding 122 to a primary winding 121. As a result electric charge accumulates in a capacitor 281, via a diode 283 and a voltage, i.e. is the voltage of a battery 10 on to which the voltage between terminals of the capacitor 281 is stacked, is supplied to the DC power-supply voltage input terminal Vcc of a control circuit 16 via a LC low pass filter 34A. Energy stored in the capacitor 281 may be effectively utilized, while the fly-back spike voltage to the control circuit 16 side is cut by a LC low pass filter 34A.

12 Claims, 8 Drawing Sheets

DC-DC CONVERTER USING FLYBACK VOLTAGE

CROSS REFERENCE TO RELATED APPLICATION

This is a Continuation-in-Part application of Ser. No. 08/202,558, filed Feb. 28, 1994 abandoned.

BACKGROUND OF THE INVENTION

The present invention relates to a DC-DC converter which pulses the DC by chopping it and then, after the voltage by a transformer, rectifies it and smoothes it to generate a DC voltage, for devices that use an insulated DC voltage in a transformer, rectifies it and smoothes it to generate a DC voltage, for devices that use a high DC voltage such as plasma display devices and electroluminescent display devices.

With the demands for small size, light weight and low power OA devices, there are similar demands for DC-DC converters.

FIG. 5 shows a prior art DC-DC converter. A primary winding 121 of a transformer 12A and a MOS transistor switch 14 are connected in series with a battery 10. This MOS transistor switch 14 is cyclically turned ON/OFF by a pulse train which is output from a control circuit. To increase the conversion efficiency by reducing the ON resistor of the MOS transistor switch 14 and to achieve high-speed switching of the MOS transistor switch 14, a power-supply voltage Vcc for the control circuit 16 is greater than a voltage Vdd of the battery 10. For example, when Vdd equals 12 V, Vcc equals 15 V.

AC, which has been induced in a secondary winding 123 of the transformer 12A, is rectified by a diode 18, smoothed by a capacitor 20 and then supplied to a power-supply voltage input terminal Vcc of the control circuit 16. Since no voltage is induced in the secondary winding 123 until the MOS transistor switch 14 is turned ON/OFF, the voltage is initially supplied to the control circuit 16 from the battery 10 via the diode 22.

The AC voltage that is induced in the secondary winding 122 of the transformer 12A is then rectified by a rectifier circuit 24A, smoothed by a smoothing circuit 26A and output as the DC voltage Vee.

When the MOS transistor switch 14 is turned OFF from the ON state, a fly-back voltage is induced to the primary winding 121 from the secondary winding 122 and a high voltage spike noise is applied to the MOS transistor. Switch 14 and the control circuit 16. To eliminate this spike noise, a snubber circuit 28A is connected to the primary winding 121. With this fly-back voltage a capacitor 281 is charged and the charge is discharged via a resistor 282A.

FIG. 6 shows another prior art DC-DC converter. In this circuit, a transformer 12 that is provided with only a single winding 122 on the secondary side and the output voltage Vee is supplied to a 3-terminal regulator 30 to generate the power-supply voltage Vcc for the control circuit 16.

However, in the circuit shown in FIG. 5, since the transformer 12A is provided with two secondary windings, the size and weight of the transformer 12A is increased.

Also, in the circuit shown in FIG. 6, as the voltage Vee is stepped down to the voltage Vcc by the 3-terminal regulator 30, power consumption of the 3-terminal regulator is considerable.

SUMMARY OF THE INVENTION

Accordingly, an object of the present invention is to provide a DC-DC converter which requires low power, is small in size and is light in weight.

Another object of the present invention is to provide a display unit which requires low power, is small in size and is light in weight.

FIG. 1 shows the principle structure of the DC-DC converter according to the present invention.

According to one aspect of the present invention, a DC-DC converter has first and second DC power-supply voltage inputs. The DC-DC converter includes a transformer 12 having a primary winding 121 with first and second terminals, and a secondary winding 122. The first terminal of the primary winding 121 is coupled to the first DC power-supply voltage input: A switching device 14 is coupled between the second terminal of the primary winding 121 and the second DC power-supply voltage input. The switching device 14 has a control input for turning ON/OFF.

A control circuit 16 for supplies a pulse train to the control input. A snubber circuit 28, coupled between the first and second terminals of the primary winding 121, absorbs energy of fly-back voltage from the secondary winding 122 to the primary winding 121 when the switching device 14 is turned OFF. The snubber circuit 28 provides a voltage output generated by absorbed energy of the fly-back voltage, a voltage of the voltage output of the snubber circuit 28 being stacked onto a voltage of the first DC power-supply voltage input for providing a power source voltage to the control circuit 16.

In the present invention, the energy of the fly-back voltage from the secondary winding 122 to the primary winding 121 when the switching device 14 is turned OFF, is absorbed by the snubber circuit 28. The absorbed energy is used as the power-supply voltage of the control circuit 16. The output voltage of the snubber circuit 28 is stacked onto the DC power-supply input voltage. As a result, the energy generated by the fly-back voltage is effectively utilized and another secondary winding in the transformer is not necessary for the power source of the control circuit and thus a low power, DC-DC converter small in size and light in weight may be realized.

In one form of the above-described invention, the DC-DC converter further includes a low pass filter 34 coupled between the voltage output of the snubber circuit 28 and a DC power-supply voltage input of the control circuit 16. With this low pass filter 34, the voltage is smoothed and the fly-back spike voltage is cut.

In a second form of the above-described invention, the snubber circuit includes a capacitor having first and second terminals. The first terminal of the capacitor is coupled to the first terminal of the primary winding 121. A discharge unit, coupled in parallel to the capacitor, discharges a portion of electric charge accumulated in the capacitor. A diode, coupled between the second terminal of the primary winding 121 and the second terminal of the capacitor, limits a current direction in order to stack a voltage of the capacitor 281 onto the voltage of the first DC power-supply voltage input.

In a third form of the above-described invention, the discharge unit is a resistor.

In a fourth form of the above-described invention, the discharge unit is a Zener diode.

According to another aspect of the present invention, a display unit, for example, a plasma display unit, includes: a display panel; a driver circuit for driving the display panel; and the above-described DC-DC converter.

Other features and advantages of the present invention will become apparent from the following description of the preferred embodiments when the same is read in conjunction with the accompanying drawings.

DESCRIPTION OF THE PREFERRED EMBODIMENTS

Figure 1:
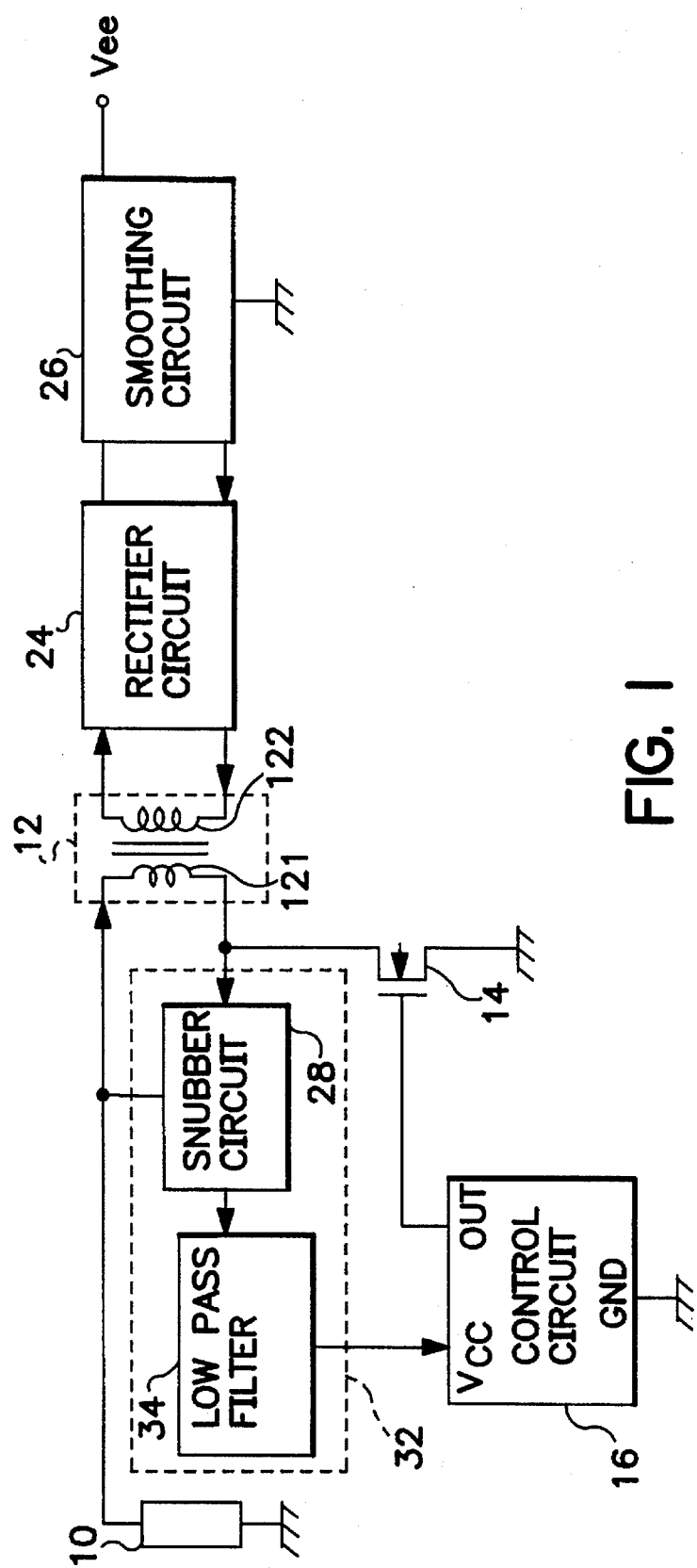
FIG. 1 is a circuit diagram showing the principle structure of the DC-DC converter according to the present invention.

Referring now to the drawings, wherein like reference characters designate like or corresponding parts throughout several views, embodiments of the present invention are described below.

First Embodiment

Figure 2:
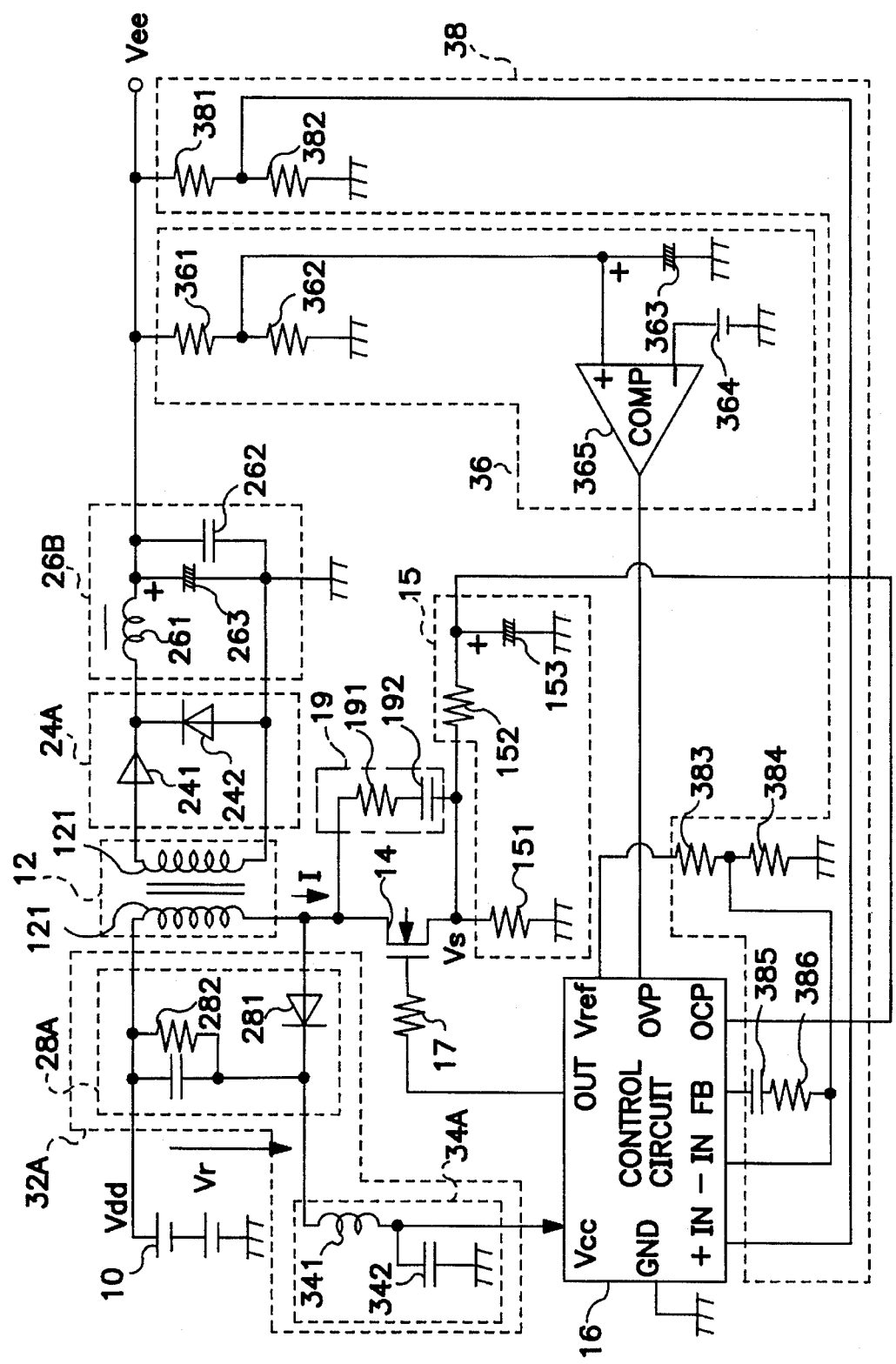
FIG. 2 is a circuit diagram showing the first embodiment of the DC-DC converter according to the present invention.

FIG. 2 shows a DC-DC converter in the first embodiment.

Figure 3:
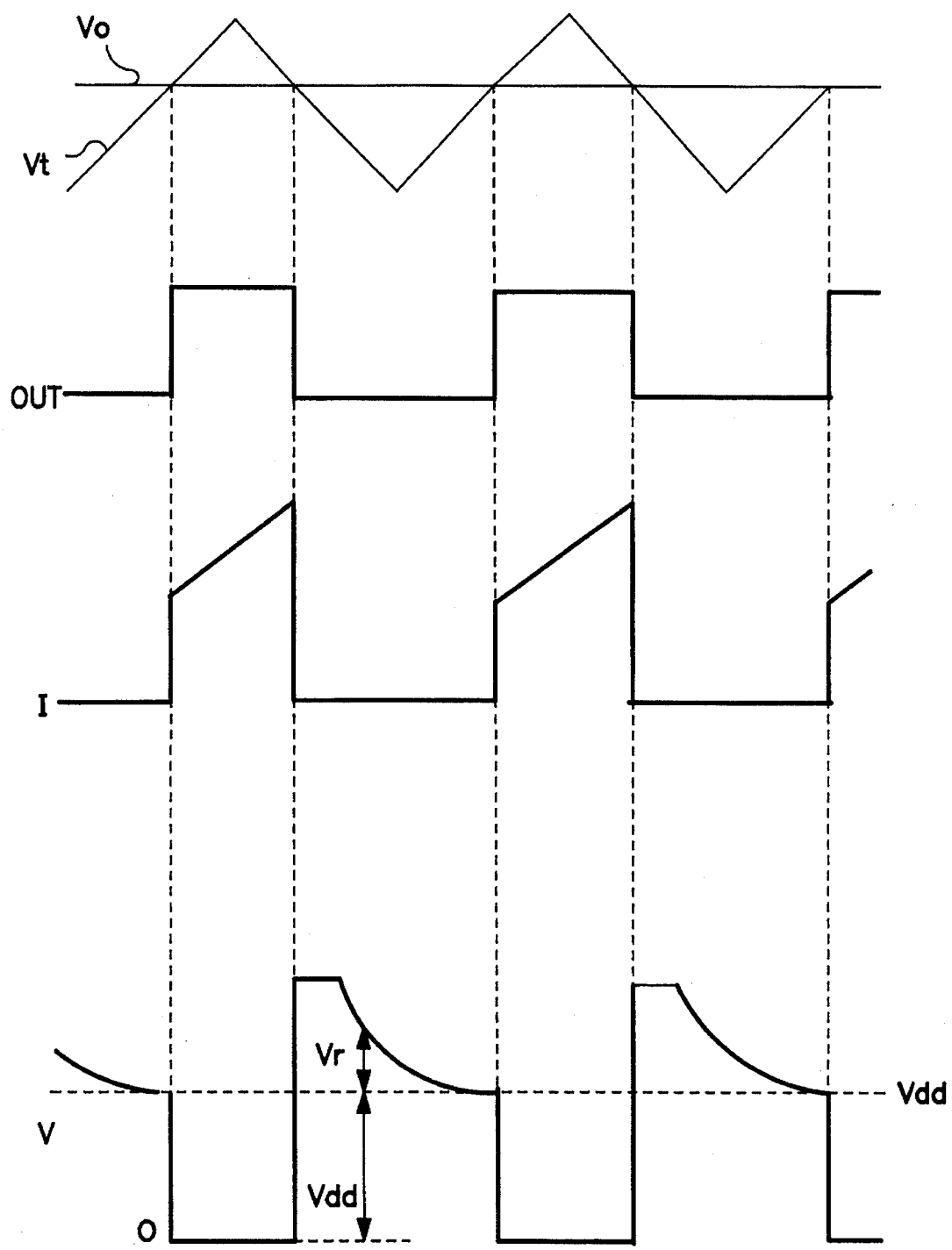
FIG. 3 is a wave-form diagram illustrating the operation of the circuit in FIG. 2.

The positive electrode of the battery 10 is connected to one terminal of the primary winding 121 of the transformer 12. The other terminal of the primary winding 121 is connected to the ground line via the MOS transistor switch 14 and a resistor 151 in a current detection circuit 15. The control circuit 16 that controls the ON/OFF of the MOS transistor switch 14 is, for example, an IC of model MB3770 made by Fujitsu Co., and is internally provided with a circuit that generates triangular waves Vt as shown in FIG. 3, a circuit that generates the reference voltage VO and a comparator that compares the triangular waves Vt and the reference voltage VO to generate an output signal OUT as shown in FIG. 3. An output terminal OUT is connected to the gate of the MOS transistor switch 14 via a resistor 17. Only when the output terminal OUT is at high does the MOS transistor switch 14 turn ON. In order to bypass the current spike that runs through the MOS transistor switch 14, when turning ON/OFF the MOS transistor switch 14, a resistor 191 and a capacitor 192 connected in series, are connected in parallel to the MOS transistor switch 14.

The secondary winding 122 of the transformer 12 is connected to the output terminal of the DC voltage Vee via a rectifier circuit 24A a the smoothing circuit 26B, as in the prior art. The rectifier circuit 24A consists of a diode 241 and a diode 242. The smoothing circuit 26B consists of a coil 261, a capacitor 262 and an electrolytic capacitor 263.

Since, when the MOS transistor switch 14 shifts from ON to OFF, a fly-back spike voltage is induced from the secondary winding 122 to the primary winding 121, the snubber circuit 28A is connected to the primary winding 121 in order to absorb this energy. The snubber circuit 28A includes the capacitor 281, a resistor 282 and a diode 283. One terminal of the capacitor 281 is connected to one terminal of the primary winding 121. The resistor 282 is connected to the capacitor 281 in parallel. The other terminal of the capacitor 281 is connected to a cathode of the diode 283 and an anode of the diode 283 is connected to the other terminal of the primary winding 121.

With this fly-back voltage, an electric charge is accumulated in the capacitor 281 through the diode 283 and the stored charge is gradually discharged through the resistor 282. In order to effectively utilize the stored energy in the capacitor 281, the cathode of the diode 283 is connected to the power-supply voltage input terminal Vcc of the control circuit 16 via an LC low pass filter 34A. The snubber circuit 28A and the LC low pass filter 34A constitute an auxiliary power source circuit 32A for the control circuit 16.

Prior art additional circuits for the control circuit 16 are now briefly explained.

For example, when the output terminal of the voltage Vee.short-circuits with the ground line, an over current runs through the MOS transistor switch 14. In order to detect this over current, the current detection circuit 15 includes a resistor 151 for converting the current that runs to the MOS transistor switch 14 to a voltage, and an integrating circuit consisting of a resistor 152 and an electrolytic capacitor 153 for smoothing the spike. The output is supplied to an input terminal OCP of the control circuit 16. When the control circuit 16, detects with its internal comparator, that the voltage of an input terminal OCP has exceeded the reference voltage, the control circuit 16 forcibly sets the output terminal OUT to low voltage to stop the operation of the transformer 12.

The over voltage detection circuit 36 is for detection if that the output voltage Vee has become an over voltage, that is, a voltage exceeding a specified value. Further, the over voltage detection circuit 36 is provided with resistors 361 and 362 that divide the output voltage Vee, an electrolytic capacitor 363 for ignoring an over voltage caused by noise, a reference voltage generator 364 and a comparator 365 that compares a voltage of the reference voltage generator 364 with the voltage between the terminals of the electrolytic capacitor 363. The output from the comparator 365 is supplied to an input terminal OVP of the control circuit 16. The control circuit 16 forcibly sets the output terminal OUT to low voltage to stop the operation of the transformer 12 when the input terminal OVP goes to high voltage.

A feedback circuit 38 consists of resistors 381 and 382 for supplying the divided voltage of the output voltage Ves to a terminal +IN of the control circuit 16. The resistors 383 and 384 divide the reference voltage Vref generated by the control circuit 16 and supply it to an input terminal −IN of the control circuit 16, and a capacitor 385 and a resistor 386 that form an external added circuit for the control circuit 16. The control circuit 16 adds an AC component of the difference between the two divided voltages to the divided voltage of the Vref via the capacitor 385 and resistor 386, and controls the duty ratio of the pulse from the output terminal OUT so that the output voltage Vee is constant.

In FIG. 2, the relevant values may be set at, for example, Vdd=12 V, Vcc=18 V and Vee=100 V.

The operation of the DC-DC converter described above is now explained.

Initially, since the transformer 12 is not yet operating, the voltage Vdd of the battery 10 is applied to the power-supply voltage input terminal Vcc of the control circuit 16, via a resistor 282 and a coil 341, to start up the operation of the control circuit 16.

When the output terminal OUT of the control circuit 16 shifts to high voltage and the MOS transistor switch 14 is turned ON, current runs to the primary winding 121 and a voltage is induced in the secondary winding 122.

When the output terminal OUT of the control circuit 16 shifts to low voltage and the MOS transistor switch 14 is turned OFF, a fly-back voltage is induced from the secondary winding 122 to the primary winding 121 and the electric charge is stored in the capacitor 281 via the diode 283. At this point, the high frequency spike noise is prevented from passing through the winding 341 due to inductance in the coil 341. The little amount of high frequency spike noise that does pass to that side is absorbed by the capacitor 342. The sum of the voltage Vdd of the battery 10 and the voltage Vr between the terminals of the capacitor 281 is smoothed in the LC low pass filter 34A and then supplied to the power-supply voltage input terminal Vcc. The remaining energy is consumed by the resistor 282.

The current I which runs to the MOS transistor switch 14 and the voltage V between the drain of the MOS transistor switch 14 and the ground line are as shown in FIG. 3.

Figure 5:
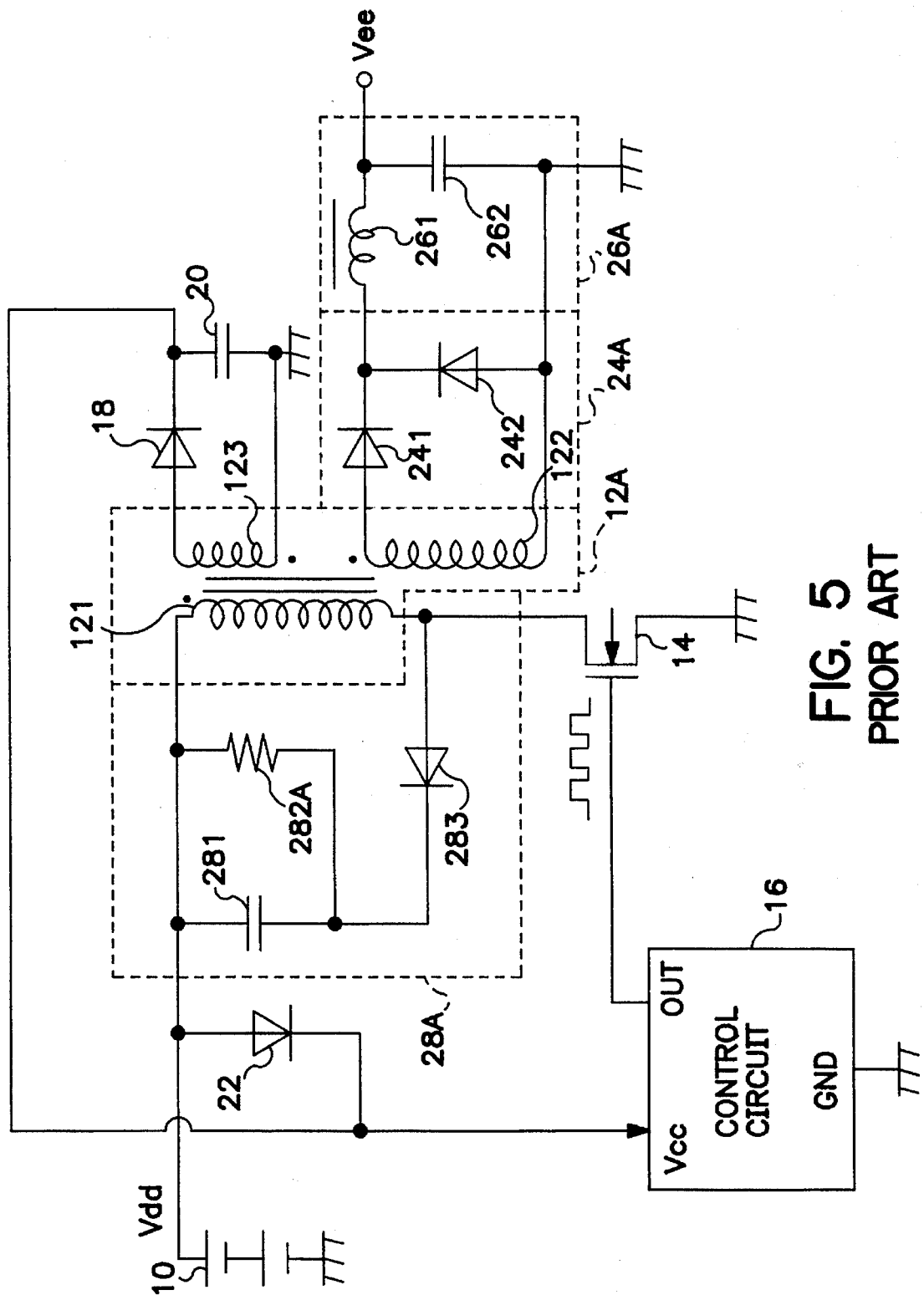
FIG. 5 is a circuit diagram showing a prior art DC-DC converter.
Figure 6:
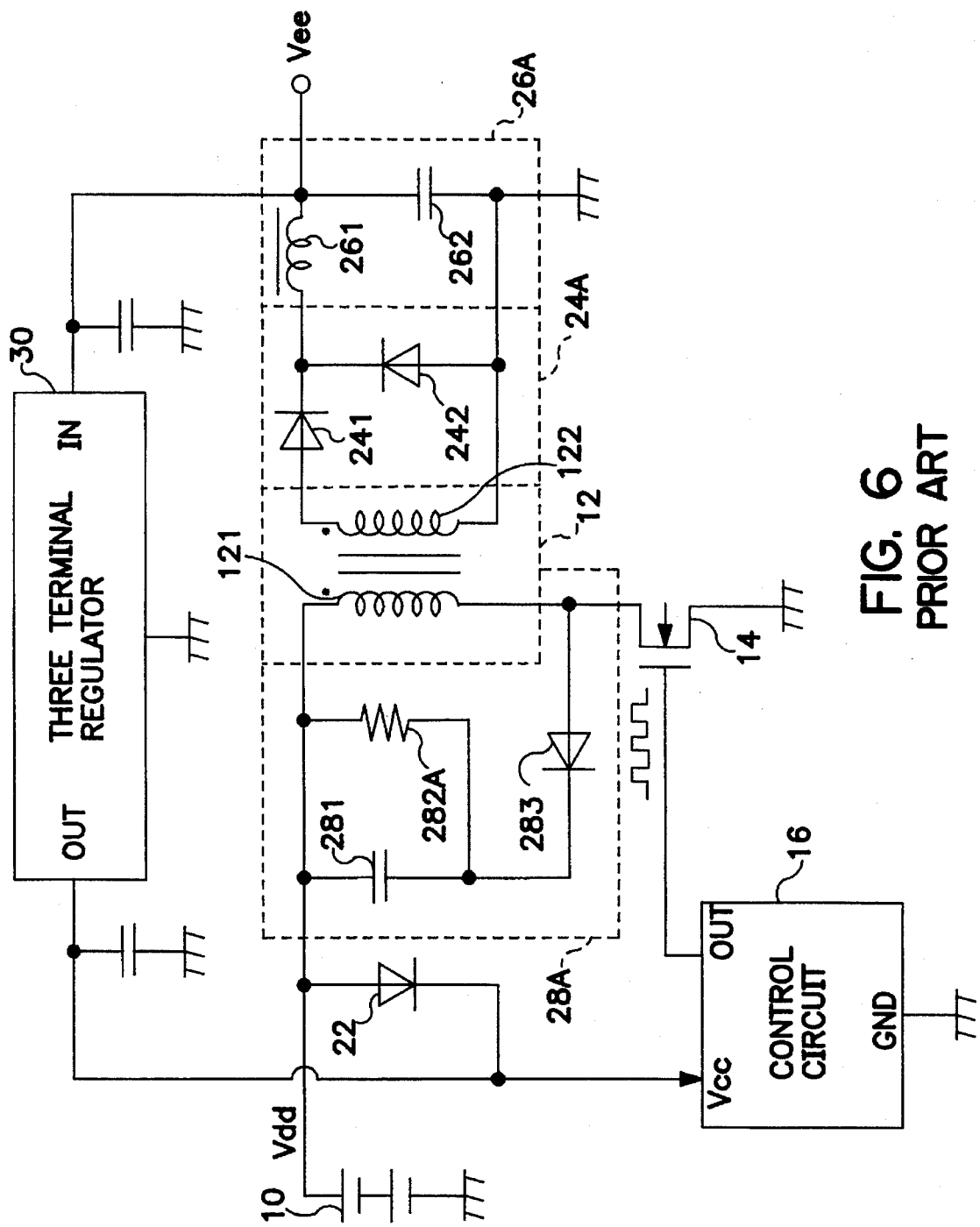
FIG. 6 is a circuit diagram showing another prior art DC-DC converter.

According to the first embodiment of the present invention, there is no need of the diode 22 as shown in FIGS. 5 and 6 for start up.

Second Embodiment

Figure 4:
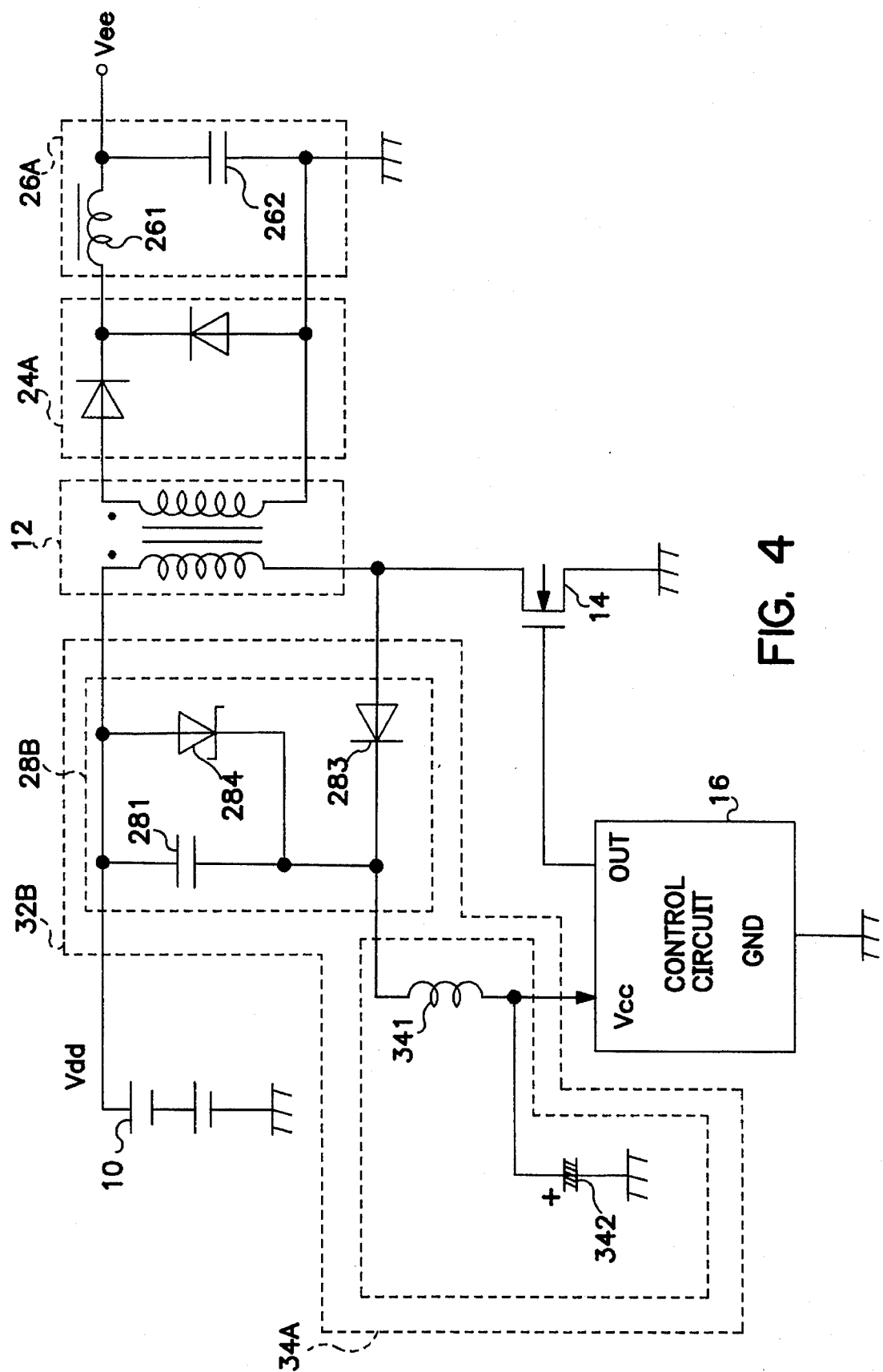
FIG. 4 is a circuit diagram showing the second embodiment of the DC-DC converter according to the present invention.

FIG. 4 shows a schematic structure of the DC-DC converter in the second embodiment. The same reference characters are assigned to identical components to those in FIG. 2.

Instead of the resistor 282 shown in FIG. 2, a Zener diode 284 is used in the snubber circuit 28B. An auxiliary power source circuit 32B, includes the snubber circuit 28B and the LC low pass filter 34A. The preferable breakdown voltage of the Zener diode 284 is the value equal to the voltage Vdd of the battery 10 and in the example above, the value is 12 V. When the voltage between the terminals of the capacitor 281 exceeds this breakdown voltage a current runs in the opposite direction through the Zener diode 284, efficiently utilizing the energy generated by the fly-back voltage. All other aspects of the second embodiment are identical to those of the first embodiment described above.

Third Embodiment

Figure 7:
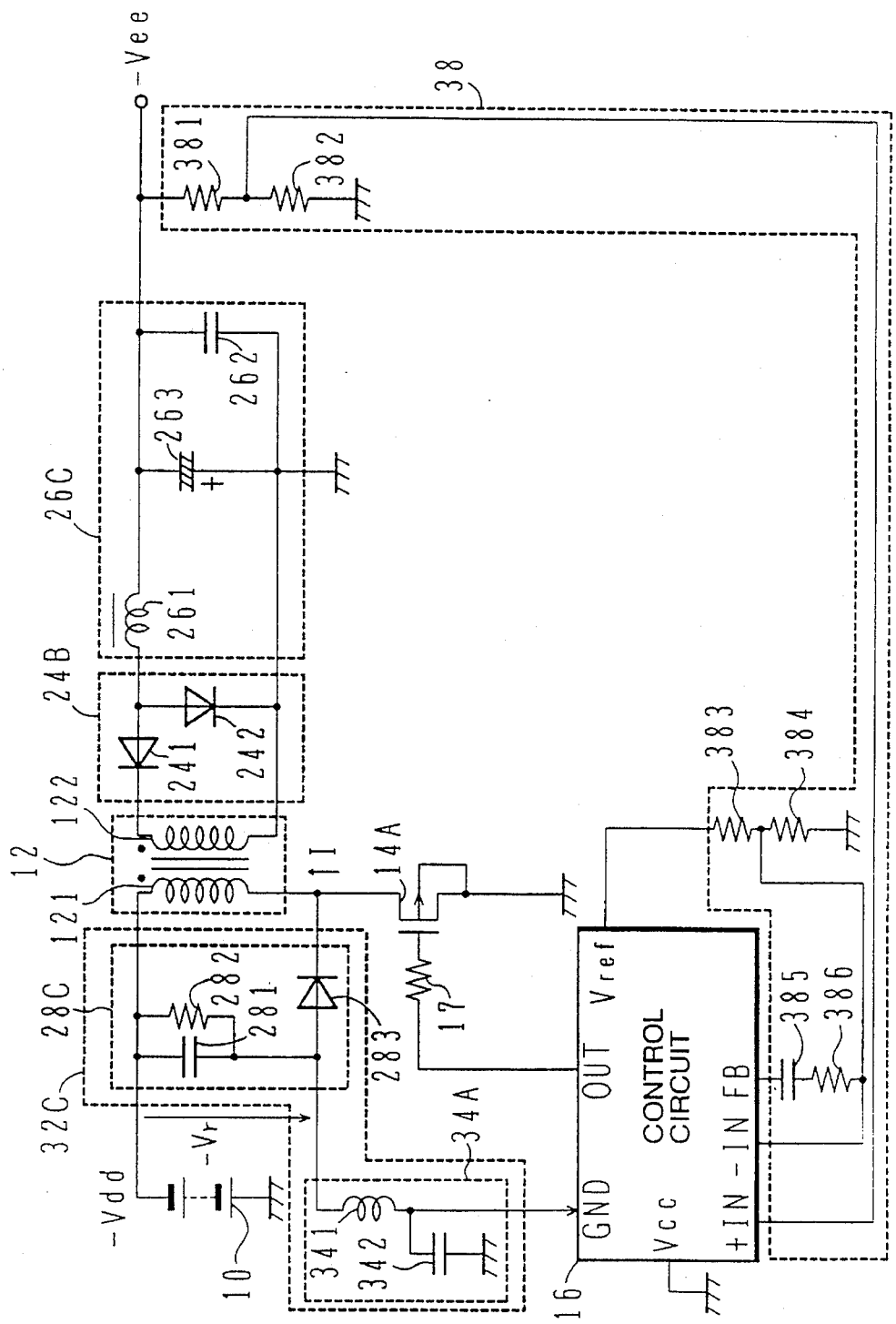
FIG. 7 is a circuit diagram showing the third embodiment of the DC-DC converter according to the present invention.

FIG. 7 shows a schematic structure of a DC-DC converter in the third embodiment.

In this DC-DC converter, a battery 10, a diode 283 of the snubber circuit 28C, diodes 241 and 242 of the rectifying circuit 24B and a electrolytic capacitor 263 of the smoothing circuit 26C are connected in the opposite direction compared to that shown in FIG. 2 to generate a negative DC voltage −Vee. As a result, the output terminal of the LC low pass filter 34A is connected to one of the power-supply voltage input terminals GND in the control circuit 16. Additionally another power-supply voltage input terminal GND of the control circuit 16 is connected to a ground line and instead of the NMOS transistor switch 14 shown in FIG. 2, a PMOS transistor switch 14A is used. The direction of the diode 283 is such that a voltage of the battery 10 is stacked up with a voltage of capacitor 281. For the sake of simplification, the circuits 15, 19 and 36 in FIG. 2 are not shown in FIG. 5.

As is clear from the structure described above, in the operation of this DC-DC converter, the direction of the electric current is the reverse of that shown in FIG. 2.

Also, for the snubber circuit 28C, in place of the resistor 282, a Zener diode may be used, connected in the reverse direction of the direction shown in FIG. 4. In both cases, the direction of this Zener diode is opposite to the direction of diode 283 in the loop of this Zener diode, diode 283 and coil 121.

Fourth Embodiment

Figure 8:
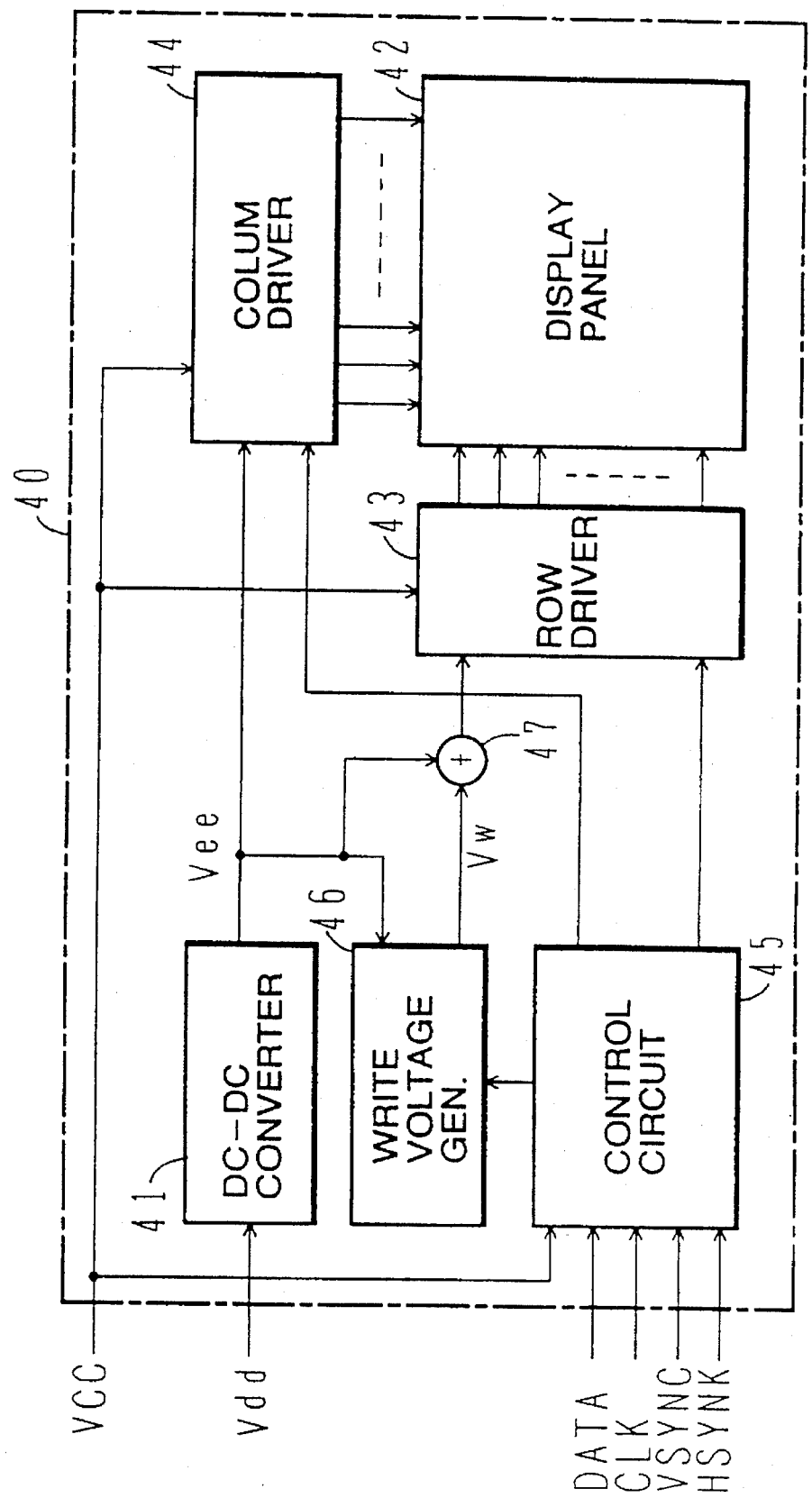
FIG. 8 is a block diagram showing the fourth embodiment of the plasma display unit employing a DC-DC converter according to the present invention.

FIG. 8 shows an AC and two-electrode type plasma display unit 40 in the fourth embodiment, employing a DC-DC converter according to the present invention.

While in the prior art power-supply voltage VCC, which may be, for example, 5 V, and Vee, which may be, for example, 100 V are supplied to the plasma display unit 40 without using a DC-DC converter 41, in this embodiment, the DC-DC converter 41 is used to supply the source voltage VCC and the voltage Vdd which may be, for example, 12 V to the plasma display unit 40.

Outputs from a row driver 43 and a column driver 44 are supplied to the row electrodes and column electrodes respectively, of a display panel 42. The row driver 43 supplies drive signals for scanning line sequentially to the row electrodes of the display panel 42 based upon a scanning signal and control signals from a control circuit 45. Alternatively, it supplies the row electrodes with one of the potentials of the maintenance voltage. The column driver 44 supplies drive signals for displaying one row to the column electrodes of the display panel 42 each time the horizontal synchronization signal HSYNC pulses, based upon the display data and a control signal from the control circuit 45. Alternatively, it supplies the column electrode with the other potential of the maintenance voltage. The control circuit 45 generates signals for the row driver 43 and the column driver 44, described above, based upon a display data DATA, a clock CLK, a vertical synchronization signal VSYNC and a horizontal synchronization signal HSYNC.

The power-supply voltage VCC is supplied to logic circuits in the row driver 43, the column driver 44 and the control circuit 45. The column electrode drive voltage is supplied to the column driver 44 from an DC-DC converter 41, which converts the DC voltage Vdd to the DC voltage Vee. The voltage Vee is supplied to a write voltage generating circuit 46 and also to one of the input terminals of an adder circuit 47. Based upon a control signal from the control circuit 45, the write voltage generating circuit 46 generates a write voltage Vw during a specific period of time using the voltage Vee, to supply to the other input terminal of the adder circuit 47. The voltage output from the adder circuit 47 is supplied to the row electrodes of the display panel 42 via the row driver 43 as the maintenance voltage when Vw=0, or the scanning voltage when Vw>0.

The plasma display unit 40 structured as described above can use a battery and since a relatively light weight voltage transformer is used for the DC-DC converter 41, the weight of the plasma display unit 40 itself is reduced. Further since the energy of the flyback voltage is effectively used in the DC-DC converter 41, the length of time over which the battery can be used increases.

The DC-DC converter according to the present invention may be applied to various kind of flat panel display unit such as 3-electrode type plasma display unit, DC type plasma display unit, electroluminescent display unit and so on.

Having described specific embodiments of the present invention, it is to be understood that modification and variation of the invention are possible without departing from the spirit and scope thereof.

What is claimed is:

1. A DC-DC converter having first and second DC power-supply voltage inputs comprising:

a transformer having a primary winding with first and second terminals and having a secondary winding, said first terminal of said primary winding being coupled to the first DC power-supply voltage input;

a switching device coupled between said second terminal of said primary winding and the second DC power-supply voltage input, said switching device having a control input for turning ON/OFF;

a control circuit for supplying a pulse train to said control input; and a snubber circuit, coupled between said first and second terminals of said primary winding, for absorbing energy of fly-back voltage from said secondary winding to said primary winding when said switching device is turned OFF, said snubber circuit providing a voltage output generated by absorbed energy of said fly-back voltage, a voltage of said voltage output of said snubber circuit being stacked onto a voltage of said first DC power-supply voltage input for providing a power source voltage to said control circuit.

2. A DC-DC converter according to claim 1, further comprising:

a low pass filter coupled between said voltage output of said snubber circuit and a DC power-supply voltage input of said control circuit.

3. A DC-DC converter according to claim 2, further comprising:

a rectifier circuit for rectifying AC voltage induced in said secondary winding to provide a rectified DC voltage; and a smoothing circuit for smoothing said rectified DC voltage to provide a smoothed DC voltage as a DC power-supply output.

4. A DC-DC converter according to claim 3, further comprising:

an over-voltage protection circuit for forcibly turning said switching device to off when said DC power-supply output exceeds a reference voltage.

5. A DC-DC converter according to claim 3 wherein said control circuit controls a duty ratio of said output pulse so that said DC power-supply output becomes constant.

6. A DC-DC converter according to claim 2 wherein said low pass filter is a LC low pass filter.

7. A DC-DC converter according to claim 1 wherein said snubber circuit comprises:

a capacitor having first and second terminals, said first terminal of said capacitor being coupled to said first terminal of said primary winding;

a discharge unit, coupled in parallel to said capacitor, which discharges a portion of electric charge accumulated in said capacitor; and a diode connected between said second terminal of said primary winding and said second terminal of said capacitor to limit a current direction in order to stack a voltage of said capacitor onto said voltage of said first DC power-supply voltage input.

8. A DC-DC converter according to claim 7 wherein said discharge unit is a resistor.

9. A DC-DC converter according to claim 7 wherein said discharge unit is a Zener diode.

10. A DC-DC converter according to claim 1, further comprising:

an over-current protection circuit for forcibly turning said switching device to off when a time-average of current flowing through said switching device exceeds a reference value.

11. A display unit comprising:

a display panel;

a driver circuit for driving said display panel; and a DC-DC converter having first and second DC power-supply voltage inputs, said DC-DC converter comprising:

a transformer having a primary winding, with first and second terminals, and a secondary winding, said first terminal of said primary winding being coupled to the first DC power-supply voltage input;

a switching device coupled between said second terminal of said primary winding and the second DC power-supply voltage input, said switching device having a control input for turning ON/OFF;

a control circuit for supplying a pulse train to said control input; and a snubber circuit, coupled between said first and second terminals of said primary winding, for absorbing energy of fly-back voltage from said secondary winding to said primary winding when said switching device is turned OFF, said snubber circuit providing a voltage output generated by absorbed energy of said fly-back voltage, a voltage of said voltage output of said snubber circuit being stacked onto a voltage of said first DC power-supply voltage input for providing a power source voltage to said control circuit.

12. A display unit according to claim 11, wherein said display panel is a plasma display panel.

* * * * *